United States Patent
Chien et al.

(10) Patent No.: US 9,639,923 B2
(45) Date of Patent: May 2, 2017

(54) BILATERAL FILTER AND A METHOD THEREOF

(71) Applicants: National Taiwan University, Taipei (TW); Himax Technologies Limited, Tainan (TW)

(72) Inventors: Shao-Yi Chien, Taipei (TW); Wei-Chi Tu, Taipei (TW); Yi-Nung Liu, Tainan (TW)

(73) Assignees: National Taiwan University, Taipei (TW); Himax Technologies Limited, Tainan (TW)

( * ) Notice: Subject to any disclaimer, the term of this patent is extended or adjusted under 35 U.S.C. 154(b) by 76 days.

(21) Appl. No.: 14/794,297

(22) Filed: Jul. 8, 2015

(65) Prior Publication Data

US 2017/0011497 A1    Jan. 12, 2017

(51) Int. Cl.
*G06T 5/00* (2006.01)
*G06T 5/20* (2006.01)
*G06T 5/40* (2006.01)

(52) U.S. Cl.
CPC .............. *G06T 5/20* (2013.01); *G06T 5/40* (2013.01); *G06T 2207/20028* (2013.01)

(58) Field of Classification Search
CPC .. G06T 5/002; G06T 5/20; G06T 5/40; H04N 5/217; H04N 5/357–5/365
See application file for complete search history.

(56) References Cited

U.S. PATENT DOCUMENTS

| | | | | |
|---|---|---|---|---|
| 8,315,473 | B1* | 11/2012 | Tao | G06T 5/20 382/168 |
| 2011/0050934 | A1* | 3/2011 | Mitsunaga | H04N 1/58 348/222.1 |
| 2011/0200269 | A1* | 8/2011 | Das Gupta | G06T 5/002 382/260 |
| 2012/0200669 | A1* | 8/2012 | Lai | G06T 5/002 348/43 |

OTHER PUBLICATIONS

Rashi Agarwal "Bit plane average filtering to remove Gaussian noise from high contrast images" IEEE 2012.*

* cited by examiner

*Primary Examiner* — Sean Motsinger
(74) *Attorney, Agent, or Firm* — Donald E. Stout; Stout, Uxa & Buyan, LLP (57) ABSTRACT

A bilateral filtering method includes decomposing an image patch by pixel intensity to form a stack of patches; computing spatial filtering response of each intensity; multiplying the spatial filtering response of each intensity by corresponding intensity, thereby resulting in multiplied spatial filtering response of each intensity; and summing up the multiplied spatial filtering responses of different intensities weighted with corresponding range weights.

20 Claims, 6 Drawing Sheets

BILATERAL FILTER AND A METHOD THEREOF

BACKGROUND OF THE INVENTION

1. Field of the Invention

The present invention generally relates to a bilateral filter, and more particularly to fast bilateral filtering using a bilateral histogram.

2. Description of Related Art

A bilateral filter is a nonlinear edge preserving filter that smooths an image while preserving edges. The intensity value at each pixel in the image is replaced by a weighted average of intensity values from nearby pixels. It has demonstrated great effectiveness for many computer vision and computer graphics problems such as tone mapping, demosaicking and low-light enhancement.

The bilateral filer is a nonlinear combination of spatial and range filters. Implementing the bilateral filter is computationally intensive owing to the nonlinearity of the range filter. Conventional techniques are proposed to speed up bilateral filtering either by confining the spatial kernel or numerical approximation. The memory cost for the conventional bilateral filtering can be unacceptable large for small kernel size.

A need has thus arisen to propose a novel scheme to overcome drawbacks of the conventional bilateral filters.

SUMMARY OF THE INVENTION

In view of the foregoing, it is an object of the embodiment of the present invention to provide fast bilateral filtering using a bilateral histogram, which is a balanced choice of bilateral filter in terms of efficiency, kernel generality and memory size.

According to one embodiment, an image patch is decomposed by pixel intensity to form a stack of patches, and spatial filtering response of each intensity is computed. The spatial filtering response of each intensity is multiplied by corresponding intensity, thereby resulting in multiplied spatial filtering response of each intensity. The multiplied spatial filtering responses of different intensities weighted with corresponding range weights are then summed up.

According to another embodiment, an image patch is decomposed by pixel intensity to form a stack of patches. A vertical spatial filtering response of each intensity is computed, and a horizontal spatial filtering response of each intensity is computed. A product of the horizontal spatial filtering response and the vertical spatial filtering response is multiplied by corresponding intensity, thereby resulting in a multiplied spatial filtering response. The multiplied spatial filtering responses of different intensity levels weighted with corresponding range weights are then summed up.

DETAILED DESCRIPTION OF THE INVENTION

The form of a bilateral filter is a nonlinear combination of spatial filters and range filters:

$$I_B(p) = \frac{1}{w(p)} \sum_{q \in N(p)} G_s(p, q) \cdot G_r(I(p), I(q)) \cdot I(q) \quad (1)$$

where $I_B(p)$ denotes a filtering output of pixel p, q denotes a neighbor pixel of p in a local region N(p), $G_s(p,q)$ and $G_r(I(p),I(q))$ denote a spatial kernel function and a range kernel function, respectively. In one example, the spatial kernel function and the range kernel function may be Gaussian function. W is a normalization factor and may be represented as $$W(p) = \sum_{q \in N(p)} G_s(p, q) \cdot G_r(I(p), I(q)) \quad (2)$$

The bilateral filter in Eq. (1) can be viewed as per pixel division of two sets of filter response, that is, J(p)/W(p). The numerator J(p) may be represented and be rearranged as follows:

$$J(p) = \sum_{q \in N(p)} G_s(p, q) \sum_i G_r(I(p), i) \cdot \delta(i, I(q)) \cdot i \quad (3)$$

where i denotes an intensity value, e.g., i∈[0, 255] for 8-bit grayscale image, and δ(·) is an indicator function $$\delta(i, I(q)) = \begin{cases} 1 & \text{if the intensity of pixel } q \text{ is } i \\ 0 & \text{otherwise} \end{cases} \quad (4)$$

Eq. (3) can be further rearranged to $$J(p) = \sum_i \overbrace{G_r(I(p), i) \cdot i \cdot \underbrace{\sum_{q \in N(p)} G_s(p, q) \cdot \underbrace{\delta(i, I(q))}_{\text{patch of intensity } i}}_{\text{spatial filtering response of intensity } i}}^{\text{weighted sum over intensity levels with range kernel}} \quad (5)$$

The denominator W(p) has the similar form:

$$W(p) = \sum_i G_r(i(p), i) \sum_{q \in N(p)} G_s(p, q) \cdot \delta(i, I(q)) \quad (6)$$

Figure 1A:
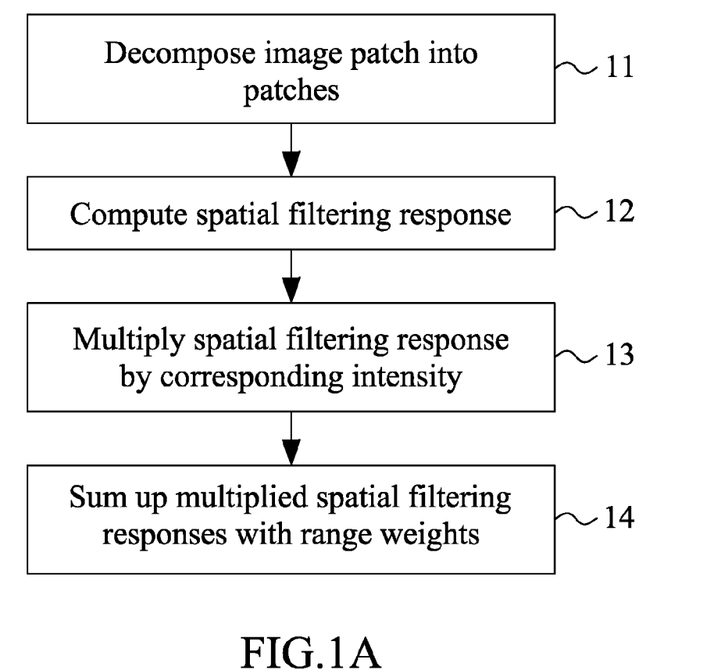
FIG. 1A shows a flow diagram illustrating a bilateral filtering method according to a first embodiment of the present invention.
Figure 1B:
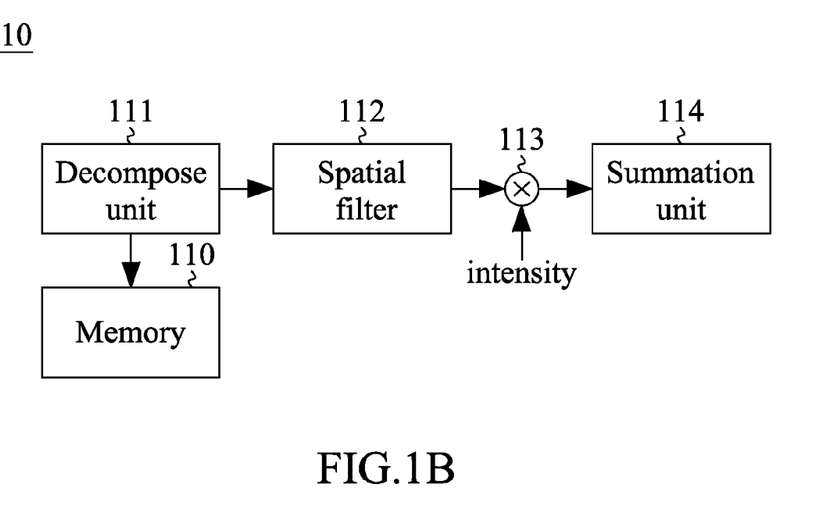
FIG. 1B shows a block diagram illustrating a bilateral filter according to the first embodiment of the present invention.

FIG. 1A shows a flow diagram illustrating a bilateral filtering method according to a first embodiment of the present invention. The bilateral filtering method shown in FIG. 1A may be operated by a processor such as a digital image processor. FIG. 1B shows a block diagram illustrating a bilateral filter 10 according to the first embodiment of the present invention. The blocks of the bilateral filter 10 may be implemented by circuits that construct a processor such as a digital image processor.

Figure 2:
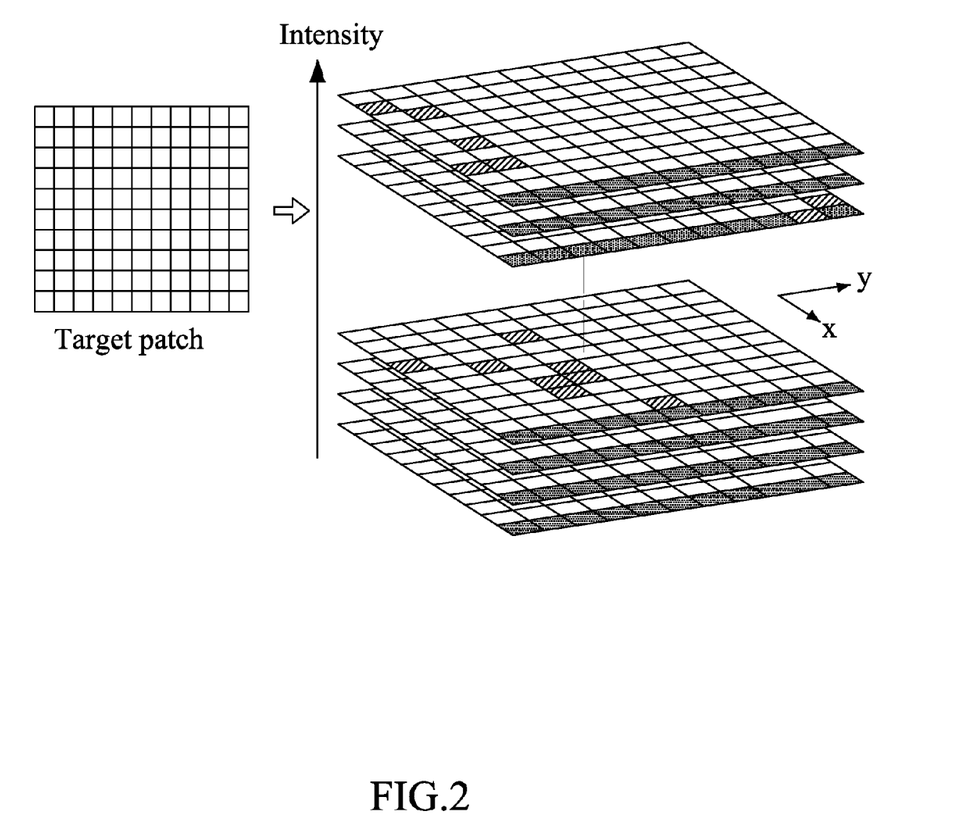
FIG. 2 shows an exemplary schematic diagram illustrating how an image patch is decomposed into patches of intensity.

At step 11, an (original) image patch is decomposed by pixel intensity to form a stack of patches $\delta(i,I(q))$ of intensity i by a decompose unit 111. The stack of patches may be stored in a memory 110. FIG. 2 shows an exemplary schematic diagram illustrating how an image patch is decomposed into patches of intensity i. Each pixel cell in the patch on the right-hand side is marked as black or white representing $\delta(i,I(q))=1$ or 0. A black pixel in the i-th patch on the right-hand side implies that the pixel intensity of this position is i in the original image on the left-hand side.

At step 12, a spatial filtering response $$\sum_{q \in N(p)} G_s(p, q) \cdot \delta(i, I(q))$$

of intensity i is computed by a spatial filter 112. At step 13, the spatial filtering response of intensity i is multiplied by the corresponding intensity i, thereby resulting in multiplied spatial filtering response. The step 13 may be carried out by a multiplier 113. Finally, at step 14, the multiplied spatial filtering responses of different intensity levels weighted with corresponding range weights $G_r(I(P), i)$ are summed up, by a summation unit 114, to result in the numerator $J(p)$ of Eq. (5).

It is noted that the computation of $J(p)$ and $W(p)$ shares the same spatial filtering response of intensity patches. The only difference is that there is no need to perform step 13 when computing $W(p)$.

According to the embodiment shown in FIG. 1A/1B, the stack structure can be advantageously shared for neighbor pixels. Specifically, when we move forward to compute the next output, the stack of patches may be efficiently built from current position by dropping the latest columns, shifting the original stack along the opposite moving direction and adding newest columns as the dotted lines depicted in FIG. 2. Moreover, the nonlinearity of the bilateral filter is relaxed to linear spatial filtering for each intensity following the range weighted summation.

For filtering a 8-bit grayscale image with radius r, we need 256×(2r+1)×(2r+1) buffer size. It is noted that the storage is a 3D table. As the stack structure is usually sparse since every pixel position only contributes to one intensity layer, a bilateral filtering method using bilateral histogram (or 2D table) is proposed according a second embodiment of the present invention.

First, a 2D spatial filtering may be decomposed into two pass 1D spatial filtering:

$$\sum_{q \in N(p)} G_s(p, q) \cdot I(q) = \sum_{x} G_s^h(p, q) \sum_{y} G_s^v(p, q) \cdot I(q) \quad (7)$$

where $G_s^h(\cdot)$ denotes a horizontal spatial filter and $G_s^v(\cdot)$ denotes a vertical spatial filter. Usually, the spatial filter kernel is isotropic and thus $G_s^h(\cdot)$ and $G_s^v(\cdot)$ are the same function, e.g., 2D Gaussian filtering as two-pass 1D Gaussian filtering. In a scanline order, vertical filter is performed first. Accordingly, the numerator $J(p)$ may be represented as follows:

$$J(p) = \sum_{i} G_r(I(p), i) \cdot i \cdot \sum_{x} G_s^h(p, q) \underbrace{\sum_{y} G_s^v(p, q) \cdot \delta(i, I(q))}_{\text{vertical spatial filter response}} \quad (8)$$

Figure 3A:
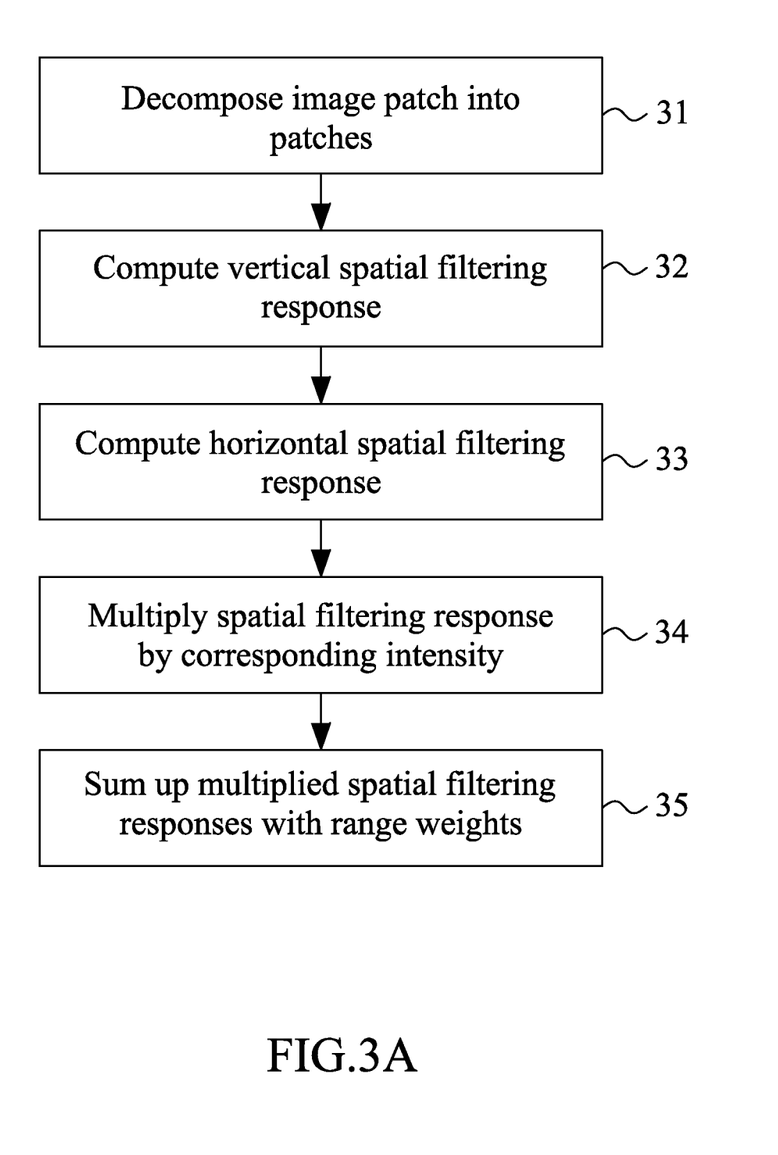
FIG. 3A shows a flow diagram illustrating a bilateral filtering method according to a second embodiment of the present invention.
Figure 3B:
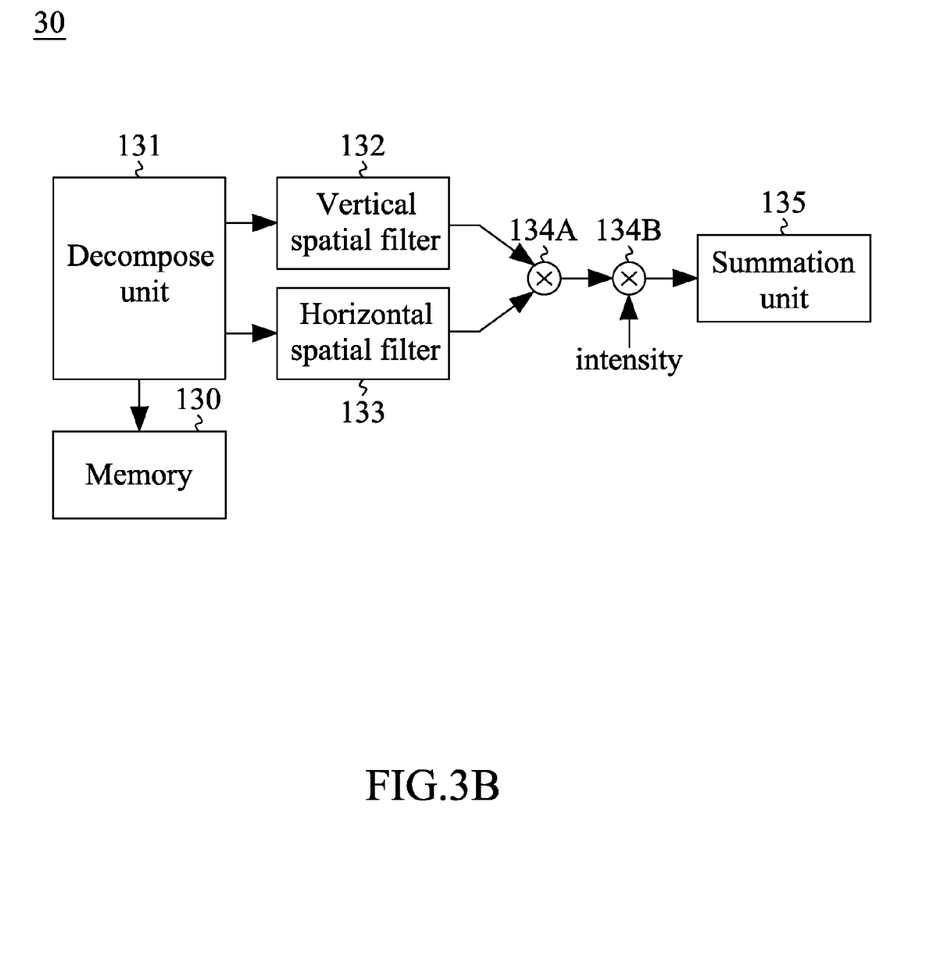
FIG. 3B shows a block diagram illustrating a bilateral filter according to the second embodiment of the present invention.

FIG. 3A shows a flow diagram illustrating a bilateral filtering method according to a second embodiment of the present invention. FIG. 3B shows a block diagram illustrating a bilateral filter 30 according to the second embodiment of the present invention. The blocks of the bilateral filter 30 may be implemented by circuits that construct a processor such as a digital image processor. At step 31, like step 11, an (original) image patch is decomposed by pixel intensity to form a stack of patches $\delta i,I(q))$ of intensity i by a decompose unit 131. The stack of patches may be stored in a memory 130. Subsequently, at step 32, a vertical spatial filtering response $$\sum_{y} G_s^v(p, q) \cdot \delta(i, I(q))$$

of intensity i is computed by a vertical spatial filter 132. At step 33, a horizontal spatial filtering response $$\sum_{x} G_s^h(p, q) \sum_{y} G_s^v(p, q) \cdot \delta(i, I(q))$$

of intensity i is computed by a horizontal spatial filter 133.

At step 34, the product of the horizontal spatial filtering response and the vertical spatial filtering response is multiplied by the corresponding intensity i, thereby resulting in a multiplied spatial filtering response. The product may be generated by a first multiplier 134A, and the multiplied spatial filtering response may be generated by a second multiplier 134B. Finally, at step 35, the multiplied spatial filtering responses of different intensity levels weighted with corresponding range weights $G_r(I(P), i)$ are summed up, by a summation unit 135, to result in the numerator $J(p)$ of Eq. (8).

Like the first embodiment, it is noted that the computation of $J(p)$ and $W(p)$ shares the same spatial filtering response of intensity patches. The only difference is that there is no need to perform step 34 when computing $W(p)$.

In the embodiment, data storage required to compute the bilateral filter response becomes a 2D table with a buffer size of 256×(2r+1) for a 8-bit grayscale image with filter radius r. One dimension of the 2D table is for intensity and the other dimension is for the vertical spatial filtering response of different horizontal positions. The 2D table is also called bilateral histogram. According to the embodiment, step 32 may thus be performed by shifting the bilateral histogram and updating the vertical spatial filtering responses of each intensity.

Figure 4:
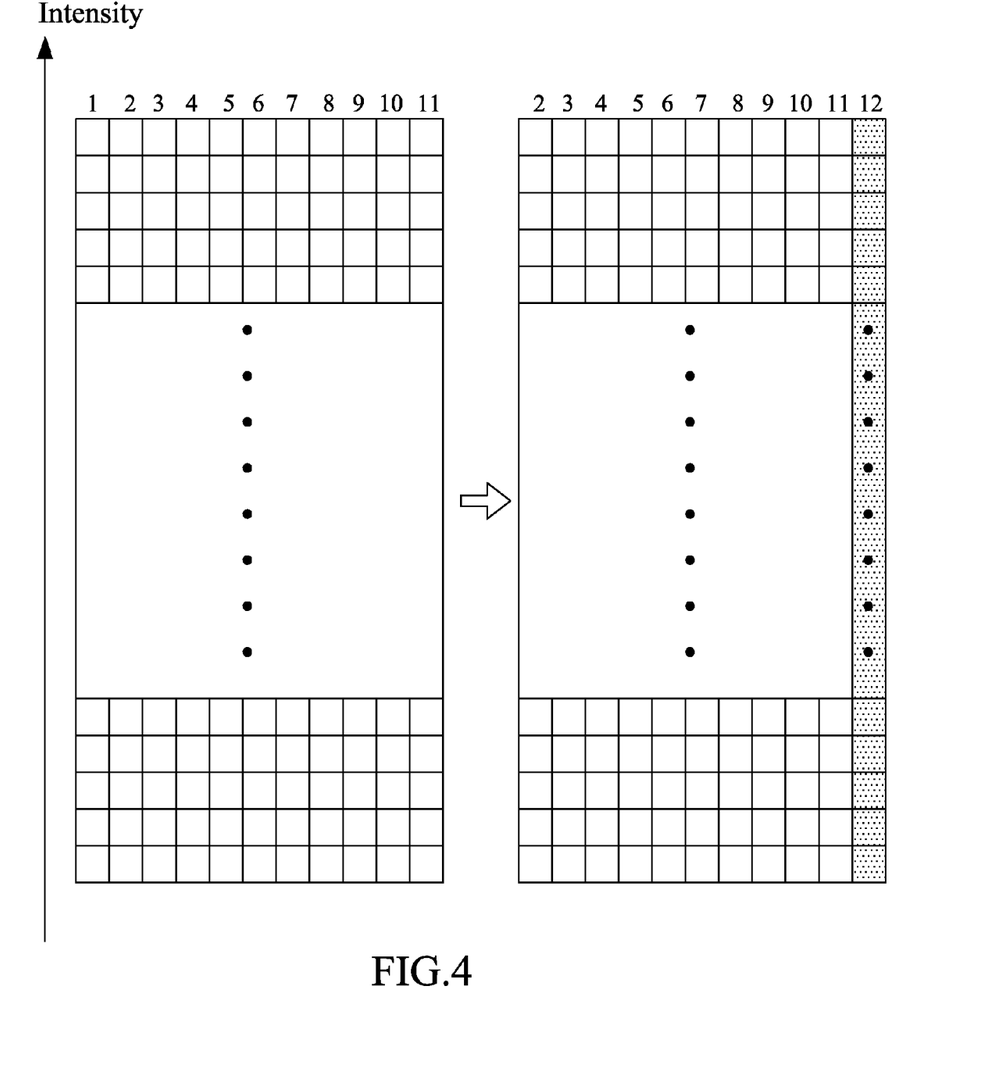
FIG. 4 shows an exemplary bilateral histogram.

FIG. 4 shows an exemplary bilateral histogram. The vertical axis denotes the intensity levels and the horizontal axis denotes the vertical filtering responses of different positions. The width of the bilateral histogram equals to the filter width, e.g., radius=5 in this example. The left table represents the histogram of pixel number 6, and the right table represents the histogram of pixel number 7. Once we have computed the filtering output of pixel number 6, we can reuse the histogram to compute the next output. The histogram is left shifted and the vertical filtering responses of the new column (dotted lines depicted in FIG. 2) is computed and updated to the right most column of the histogram. After that, the horizontal spatial filtering (step 33) is conducted along the horizontal direction of the bilateral histogram, then we sum up the spatial filtering responses with the range weights (step 34) to get the output.

Figure 5A:
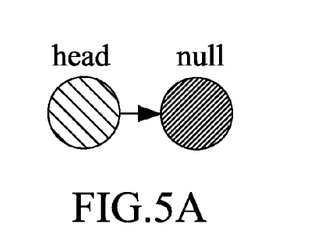
FIGS. 5A-5C illustrate a proposed FIFO structure to handle the sparsity issue of the bilateral filter.
Figure 5B:
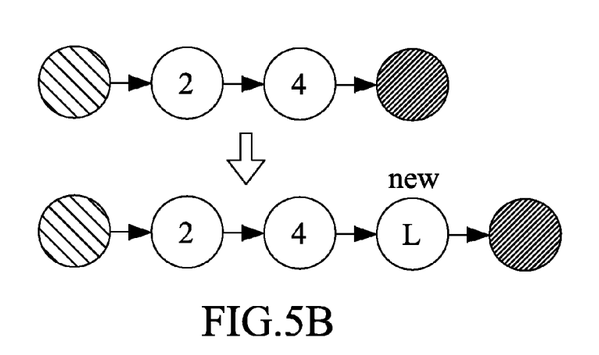
Figure 5C:
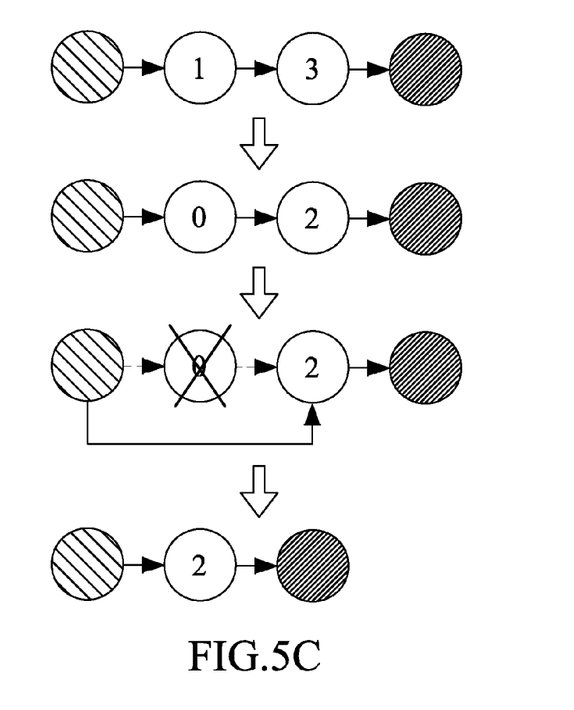

The bilateral histogram described above may reduce the storage compared to the first embodiment. However, it still happens with high probability that more than half of the entries in the histogram are empty in our quantitative evaluation. Therefore, a modified first-in-first-out (FIFO) data structure is proposed to optimize the present embodiment. FIGS. 5A-5C illustrate the proposed FIFO structure to handle the sparsity issue of the bilateral filter. We use linked list to implement the structure. Each FIFO node records the index of nonzero entries. FIG. 5A shows an empty FIFO with a head node initially pointing to the null node. The null node denotes the end of the FIFO. FIG. 5B demonstrates the process of pushing a new node. Originally, when we move forward from a pixel to the next, the bilateral histogram is shifted and the right most column is updated. With the new FIFO structure, a new node is pushed only if the vertical filtering response is nonzero, and its initial index is always L, the filter width, since we only update the right most column in the procedure. Histogram shifting becomes decreasing the index of each node by one. After that, we check the index validity of the first node. If it is out of range, we pop it as shown in FIG. 5C. In addition to the FIFO structure, we also maintain a counter variable to record the number of nodes in the FIFO. The counter will be increased or decreased by one after a pushing or popping step. In one example, we maintain one FIFO structure for each intensity row in the original bilateral histogram. With the FIFO structures and counters, we can efficiently avoid to visit empty entries and traverse the whole histogram faster.

Although specific embodiments have been illustrated and described, it will be appreciated by those skilled in the art that various modifications may be made without departing from the scope of the present invention, which is intended to be limited solely by the appended claims.

What is claimed is:

1. A bilateral filtering method, comprising:
   decomposing an image patch by pixel intensity to form a stack of patches;
   computing spatial filtering response of each intensity;
   multiplying the spatial filtering response of each intensity by corresponding intensity, thereby resulting in multiplied spatial filtering response of each intensity; and
   summing up the multiplied spatial filtering responses of different intensities weighted with corresponding range weights.

2. The method of claim 1, wherein the spatial filtering response comprises Gaussian function.

3. The method of claim 1, further comprising dividing a result of summing up the multiplied spatial filtering responses by a normalization factor.

4. The method of claim 3, wherein the normalization factor is obtained by the following steps:
   decomposing the image patch by pixel intensity to form the stack of patches;
   computing spatial filtering response of each intensity; and
   summing up the spatial filtering responses of different intensities weighted with the corresponding range weights.

5. A bilateral filtering method, comprising:
   decomposing an image patch by pixel intensity to form a stack of patches;
   computing a vertical spatial filtering response of each intensity;
   computing a horizontal spatial filtering response of each intensity;
   multiplying a product of the horizontal spatial filtering response and the vertical spatial filtering response by corresponding intensity, thereby resulting in a multiplied spatial filtering response; and
   summing up the multiplied spatial filtering responses of different intensity levels weighted with corresponding range weights.

6. The method of claim 5, wherein the vertical spatial filtering response comprises Gaussian function.

7. The method of claim 5, wherein the horizontal spatial filtering response comprises Gaussian function.

8. The method of claim 5, further comprising dividing a result of summing up the multiplied spatial filtering responses by a normalization factor.

9. The method of claim 8, wherein the normalization factor is obtained by the following steps:
   decomposing the image patch by pixel intensity to form the stack of patches;
   computing the vertical spatial filtering response of each intensity;
   computing the horizontal spatial filtering response of each intensity; and
   summing up a plurality of products of the horizontal spatial filtering response and the vertical spatial filtering response of different intensity levels weighted with corresponding range weights.

10. The method of claim 5, wherein a two-dimensional table is constructed with one dimension for intensity and the other dimension for the vertical spatial filtering response of different horizontal positions.

11. A bilateral filter, comprising:
    a decompose unit that decomposes an image patch by pixel intensity to form a stack of patches;
    a spatial filter that computes spatial filtering response of each intensity;
    a multiplier that multiplies the spatial filtering response of each intensity by corresponding intensity, thereby resulting in multiplied spatial filtering response of each intensity; and
    a summing unit that sums up the multiplied spatial filtering responses of different intensities weighted with corresponding range weights.

12. The bilateral filter of claim 11, wherein the spatial filtering response comprises Gaussian function.

13. The bilateral filter of claim 11, further comprising dividing a result of summing up the multiplied spatial filtering responses by a normalization factor.

14. The bilateral filter of claim 11, further comprising a memory for storing the stack of patches.

15. A bilateral filter, comprising:
    a decompose unit that decomposes an image patch by pixel intensity to form a stack of patches;
    a vertical spatial filter that computes a vertical spatial filtering response of each intensity;
    a horizontal spatial filter that computes a horizontal spatial filtering response of each intensity;

a first multiplier that generates a product of the horizontal spatial filtering response and the vertical spatial filtering response;

a second multiplier that multiplies the product by corresponding intensity, thereby resulting in a multiplied spatial filtering response; and a summation unit that sums up the multiplied spatial filtering responses of different intensity levels weighted with corresponding range weights.

16. The bilateral filter of claim 15, wherein the vertical spatial filtering response comprises Gaussian function.

17. The bilateral filter of claim 15, wherein the horizontal spatial filtering response comprises Gaussian function.

18. The bilateral filter of claim 15, further comprising dividing a result of summing up the multiplied spatial filtering responses by a normalization factor.

19. The bilateral filter of claim 18, further comprising a memory for storing the stack of patches.

20. The bilateral filter of claim 15, wherein a two-dimensional table is constructed with one dimension for intensity and the other dimension for the vertical spatial filtering response of different horizontal positions.

* * * * *